United States Patent [19]

Bradley, Jr.

[11] 4,092,080

[45] May 30, 1978

[54] ANTI-ROTATION LOCK FOR THREADED CONNECTION

[75] Inventor: Charles Duane Bradley, Jr., Gobles, Mich.

[73] Assignee: Pneumo Corporation, Boston, Mass.

[21] Appl. No.: 692,450

[22] Filed: June 3, 1976

[51] Int. Cl.² ............................................. F16B 39/36
[52] U.S. Cl. ................................... 403/319; 403/356; 151/2 R; 151/19 R
[58] Field of Search .................... 151/2 R, 8, 19 R, 27, 151/28, 29, 23, 25 R, 33, 54, 58; 403/315, 316, 317, 318, 319, 320, 356, 358

[56] References Cited

U.S. PATENT DOCUMENTS

| | | | |
|---|---|---|---|
| 1,005,227 | 10/1911 | Jones | 151/19 R |
| 1,201,651 | 10/1916 | Thompson | 151/19 R |
| 2,821,419 | 1/1958 | Walton | 151/8 |
| 3,122,028 | 2/1964 | Hanke | 403/356 |

FOREIGN PATENT DOCUMENTS

| | | | |
|---|---|---|---|
| 179,432 | 4/1916 | Canada | 151/2 R |
| 474,713 | 6/1951 | Canada | 151/2 R |

*Primary Examiner*—Marion Parsons, Jr.
*Attorney, Agent, or Firm*—Maky, Renner, Otto & Boisselle

[57] ABSTRACT

For adjustable length linear rods, such as the rods of linear actuators, employing threadedly connected internally threaded female and externally threaded male members, an antirotation lock is provided which includes a pair of semi-circular keys each including a projection fitting in a notch on the end face of the female member and an internal flat cooperating with an external flat on the male member. Each key includes a conical surface cooperating with a conical surface of a ring driven toward the female member by a nut threaded on the male member, thus axially to force the projections into the notches, and radially to force the flats of the keys against the flats of the male member.

15 Claims, 5 Drawing Figures

ANTI-ROTATION LOCK FOR THREADED CONNECTION

This invention relates generally as indicated to an anti-rotation lock for a threaded connection, and more particularly to a lock employing a key which is forced both into a notch in the end face of the female threaded member and against a flat on the male threaded member.

In applications where a male threaded member must be secured and locked to its corresponding female threaded member, inclined surfaces at the end of the female threaded member are often used to force a pair of wedge keys against the male member. However, the radial forces that result must be reacted by the female member, and excessive forces can lead to flaring or distortion of the female member. Moreover, dimensional limitations of the female member, particularly an internally threaded female member, correspondingly limit the magnitude of the radial force which can be reacted, therefore severely limiting the load capability of the anti-rotation lock.

Briefly, the present invention does not utilize inclined surfaces on the female member, but rather mating inclined surfaces on a key loading ring and wedge keys, the key loading ring being provided between a jam nut and the wedge keys. The wedge keys are provided with axially projecting keys interengaging notches in the end face of the female member and internal flats interengaging external flats on the male threaded member.

More particularly, the invention comprises an anti-rotation lock between an internally threaded female member and an externally threaded male member with a notch being provided in the end face of the female member, and a keyway or flat in the male member. A key having respective projections for the notch and keyway or flat is forced into locking engagement by the inclined mating surfaces on the key and key loading ring, the latter being positioned between the key and the jam nut threaded on the male member.

It is accordingly a principal object of the present invention to provide an anti-rotation lock for connected male and female threaded members having increased load limitations.

Another important object is the provision of such lock having relatively few easily manufactured parts.

Another important object is the provision of an anit-rotation lock of the type described which does not utilize inclined force reacting surfaces on the internally threaded female member.

Still another object of the present invention is the provision of such lock utilizing one or more notches in the end face of the female threaded member.

A further object is the provision of such lock utilizing flats on the male member.

A still further object is the provision of such lock utilizing a wedge key having a projection for the notch in the female member and an internal flat cooperating with the flat on the male member.

A yet further object is the provision of such lock utilizing reacting wedge surfaces on the key and a key loading ring to hold the keys in locking position.

Other objects and advantages of the present invention will become apparent as the following description proceeds.

To the accomplishment of the foregoing and related ends the invention then comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Figure 1:
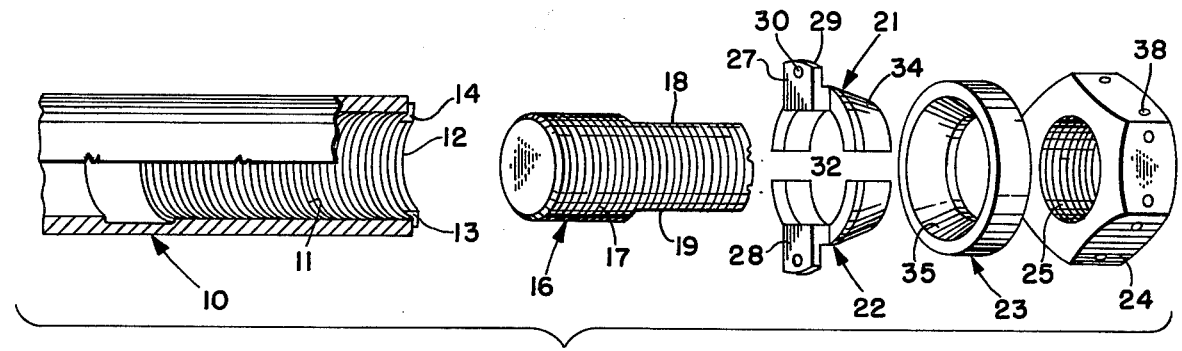
FIG. 1 is a fragmentary, partially broken away and in section exploded view of the components of an anti-rotation lock in accordance with the present invention.

Referring first to FIG. 1, it will be seen that the female member 10 is internally threaded at 11 and the end face 12 is provided with two diametrically opposed notches seen at 13 and 14.

The male member 16 is in the form of a rod provided with external threads 17. Such male member also is provided with diametrically opposed, elongated flats seen at 18 and 19, respectively.

The anti-rotation lock includes a pair of wedge keys 21 and 22 which are identical in form, a key loading ring 23, and a jam nut 24. The jam nut 24 includes internal threads 25 designed to mate with the external threads 17 of the male member. The key loading ring 23 may be slipped over the male member, and the wedge keys 21 and 22 are semi-circular in shape and are designed to fit closely over the O.D. of the male member.

Each wedge key includes an axial projection seen at 27 and 28, respectively, each projection including a slightly radially extending flange or tab 29, the outer edge of which is radiused as indicated. Each tab or flange is provided with a small aperture 30.

Figure 5:
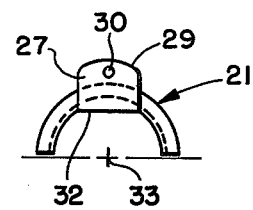
FIG. 5 is an end view of one of the wedge keys as seen from the opposite direction of the plane of line 4—4 of FIG. 3.

Each wedge key is also provided with an internal flat 32 axially coextensive with the projection and the main semi-circular body portion of the key. Such flat is perhaps more clearly seen in FIG. 5. As seen from the position of center 33 in FIG. 5, the main body portion is slightly less than a full semi-circle, and the flat and projection are centered with respect thereto. The exterior of each wedge key on the side opposite the projection is provided with a wedge or taper surface 34. Such wedge surfaces cooperate with similarly inclined internal wedge surface 35 in key loading ring 23.

Figure 2:
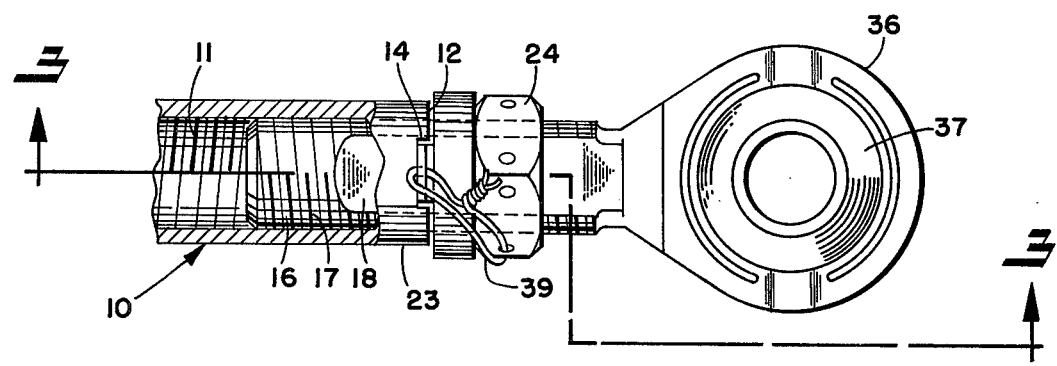
FIG. 2 is a view of the anti-rotation lock in its assembled condition with the female member partially broken away and in section.
Figure 3:
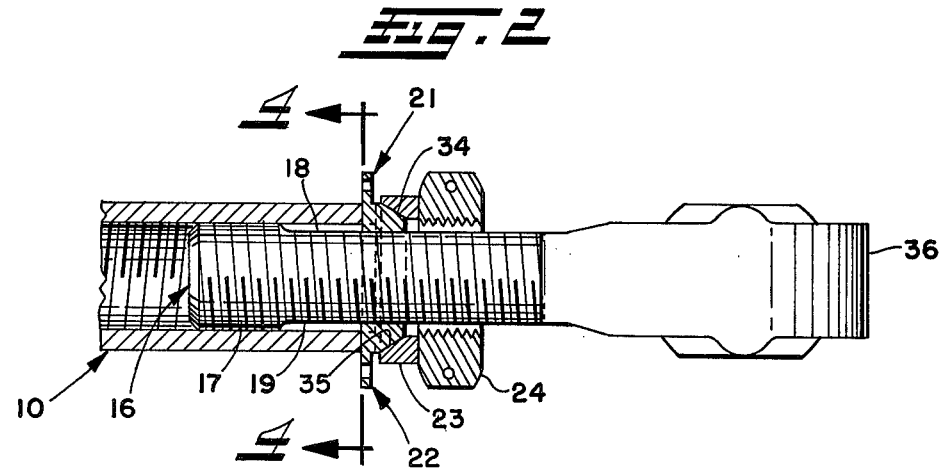
FIG. 3 is a vertical section through the assembly of FIG. 2 taken substantially on line 3—3 thereof.
Figure 4:
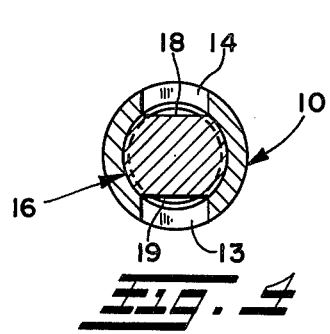
FIG. 4 is a vertical transverse section taken substantially on line 4—4 of FIG. 3.

In the assembled views of FIGS. 2 and 3, the illustrated internally threaded female member 10 is the rod of a linear actuator, while the externally threaded male member is a portion of the rod end assembly which includes the eye 36 in which is mounted the apertured spherical ball joint member 37. Such linear actuator may, for example, be used in the exhaust nozzle actuator of a jet engine. The anti-rotation lock is to prevent the rod end from rotating relative to the piston rod when subjected to torques up to, for example, 135 ft-lbs.

In assembly, the jam nut 24 is threaded on the externally threaded male member in a retracted position. The key loading ring is then slipped over the male member and the male member is then threadedly connected to the female member. When the male and female members are in the desired position, the flats 18, 19 on the male member are radially aligned with the notches 13, 14 on the female member. The wedge keys 21 and 22 are then positioned so that the projections 27 and 28 extend into the notches 14 and 13, respectively. They are also positioned so that the internal flats 32 are in engagement with the flats 18 and 19 on the male member. The key loading ring 23 is then slipped over the wedge keys and the jam nut is then tightened thereagainst so that the reacting wedge surfaces on the ring and on the keys forces the keys both radially against the flats on the male threaded member and also axially against the female threaded member. The projections 27, 28 on the wedge keys 21, 22 engage within the notches 14, 13 in the end face of the female member 10 and the flats 32 on the internal surfaces of the wedge keys mate with the external flats 18, 19 on the male member 16. When suitably tightened, the male and female members are locked against relative rotation. The jam nut is provided with small through-holes indicated at 38 so that a lock wire 39 may be secured between such holes, and the aperture 30 in the tab 29 extending radially from the axial projections 27 or 28 of the wedge keys.

It will be appreciated that the mating flats on the exterior of the male member and the interior of the wedge keys function as a key and keyway, one being a depression or slot in the circular surface of the male member, and the other being a projection from the circular surface of the wedge key. It will also be appreciated that the number of notches in the end face of the female member as well as the number of projections on the wedge keys cooperating therewith may vary. Furthermore, the particular configuration of the mating inclined surfaces between the wedge keys and key loading ring may vary and the key loading ring and nut may be formed integrally.

It can now be seen that there is provided an anti-rotation lock between an internally threaded female member and an externally threaded male member which utilizes a notch in the end face of the female member, and a keyway or flat in the male member. The wedge key has projections for both, and each projection is held in place by the radial and axial force vectors obtained by the cooperating wedge surfaces on the wedge keys and the key loading ring.

I, therefore, particularly point out and distinctly claim as my invention:

1. An anti-rotation lock between an internally threaded female member and an externally threaded male member comprising a notch in the end face of said female member, a flat on said male member, a locking member having a projection adapted to fit into said notch and a flat adapted to mate with the flat on said male member, and means to force said locking member both axially and radially in turn to force said projection into said notch and the flat of said locking member against the flat on said male member, said means to force said locking member both axially and radially comprising an axially movable loading member, and cooperating surfaces on said locking member and loading member to produce both axial and radial force vectors from the axial movement of said loading member, said locking member comprising a pair of semi-circular keys, each having an external semi-circular wedge surface, and said loading member comprising a ring having an internal wedge surface cooperating with the wedge surfaces of said keys.

2. A lock as set forth in claim 1 including a nut threaded on said male member operative to drive said ring toward the end face of said female member and thus said keys both axially and radially as aforesaid.

3. A lock as set forth in claim 1 including a pair of diametrically opposed flats on said male member, each key having an internal flat cooperating therewith.

4. A lock as set forth in claim 3 including a pair of diametrically opposed notches in the end face of said female member, each key having an axial projection cooperating therewith.

5. A lock as set forth in claim 4 wherein the projections and flats on each key are axially coextensive.

6. A lock as set forth in claim 1 including a pair of diametrically opposed notches in the end face of said female member, each key having an axial projection cooperating therewith.

7. An actuator rod having an internally threaded female member and an externally threaded male member, a notch in the end face of said female member, a flat on said male member, an anti-rotation locking member having a projection fitting in said notch and a flat engaging the flat on said male member, and means to force said locking member both axially and radially in turn to force said projection into said notch and the flat of said locking member against the flat on said male member, said means to force said locking member both axially and radially comprising an axially movable loading member, and cooperating surfaces on said locking member and loading member to produce both axial and radial force vectors from the axial movement of said loading member, said locking member comprising a pair of semi-circular keys, each having an external semi-circular wedge surface, and said loading member comprising a ring having an internal wedge surface cooperating with the wedge surfaces of said keys.

8. A rod as set forth in claim 7 including a nut threaded on said male member operative to drive said ring toward the end face of said female member and thus said keys both axially and radially as aforesaid.

9. A rod as set forth in claim 7 including a pair of diametrically opposed flats on said male member, each key having an internal flat cooperating therewith.

10. A rod as set forth in claim 9 including a pair of diametrically opposed notches in the end face of said female member, each key having an axial projection cooperating therewith.

11. A rod as set forth in claim 10 wherein the projections and flats on each key are axially coextensive.

12. A rod as set forth in claim 7 including a pair of diametrically opposed notches in the end face of said female member, each key having an axial projection cooperating therewith.

13. An anti-rotation lock between an internally threaded female member and an externally threaded male member comprising a notch in an end face of said female member, a keyway in the form of an external elongated flat on said male member, a key in the form of a semi-circular element having an axial projection adapted to fit within said notch, an internal flat on said semi-circular element cooperating with said external elongated flat on said male member, and a wedge surface on the axial end of said semi-circular element opposite said projection, and a cooperating drive member having a similar wedge surface to drive said key both axially and radially to cause said axial projection on said key to engage said notch in said female member and said internal flat on said key to engage said external elongated flat on said male member for locking said male and female members against relative rotation.

14. An anti-rotation lock between an internally threaded female member and an externally threaded male member comprising a notch in the end face of said female member, a flat on said male member, a locking member having a projection adapted to fit into said notch and a flat adapted to mate with the flat on said male member, and an axially movable loading member engageable with said locking member, said locking member having an external annular wedge surface, and said loading member having an internal annular wedge surface cooperating with the external annular wedge surface of said locking member to produce both axial and radial force vectors from the axial movement of said loading member to force said locking member both axially and radially in turn to force said projection into said notch and the flat on said locking member against the flat on said male member, said cooperating annular wedge surfaces on said locking and loading members extending annularly circumferentially beyond the edges of said flat on said male member.

15. An actuator rod having an internally threaded female member and an externally threaded male member, a notch in the end face of said female member, a flat on said male member, an anti-rotation locking member having a projection fitting in said notch and a flat engaging the flat on said male member, and an axially movable loading member engageable with said locking member, said locking member having an external annular wedge surface, and said loading member having an internal annular wedge surface cooperating with the external annular wedge surface of said locking member to produce both axial and radial force vectors from the axial movement of said loading member to force said locking member both axially and radially in turn to force said projection into said notch and the flat of said locking member against the flat on said male member, said cooperating annular wedge surfaces on said locking and loading members extending annularly circumferentially beyond the edges of said flat on said male member.

* * * * *